United States Patent [19]
Ellison

[11] 3,930,410
[45] Jan. 6, 1976

[54] WIND TUNNEL MODEL ENGINE PLUME SIMULATOR WITH INTERNAL MASS FLOW

[75] Inventor: Richard K. Ellison, Macomb County, Mich.

[73] Assignee: The United States of America as represented by the Secretary of the Army, Washington, D.C.

[22] Filed: Feb. 28, 1975

[21] Appl. No.: 554,335

[52] U.S. Cl. ............................................. 73/147
[51] Int. Cl.² .................................... G01M 9/00
[58] Field of Search ..................... 73/147, 432 SD

[56] References Cited
UNITED STATES PATENTS
3,455,155   7/1969   Greenberg et al. .................. 73/147

*Primary Examiner*—Donald O. Woodiel
*Attorney, Agent, or Firm*—Nathan Edelberg; Robert P. Gibson; Herbert H. Murray

[57] ABSTRACT

A solid missile body for testing in a wind tunnel with a solid body engine plume simulator having a passageway therethrough to simulate aspiration of the air mass at the juncture between the missile body and the engine plume.

1 Claim, 1 Drawing Figure

U.S. Patent Jan. 6, 1976 3,930,410
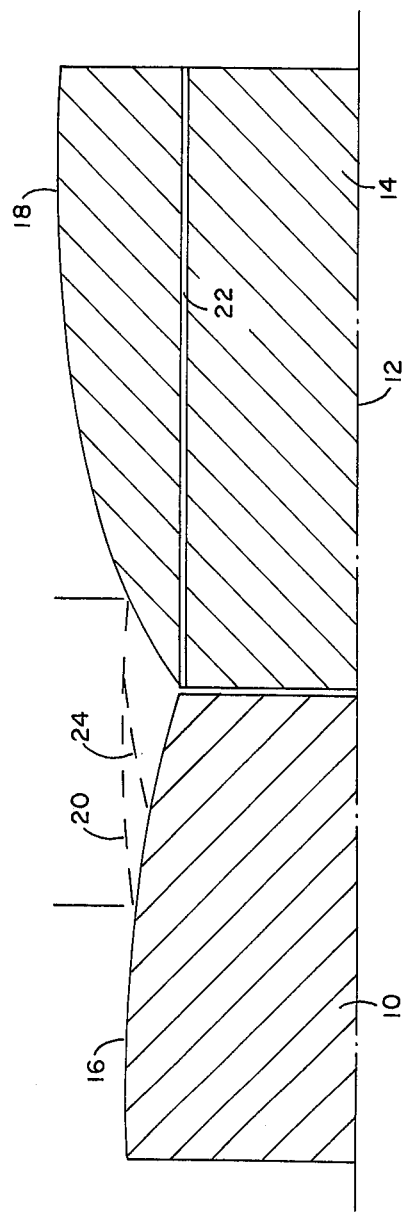

WIND TUNNEL MODEL ENGINE PLUME SIMULATOR WITH INTERNAL MASS FLOW

BACKGROUND OF THE INVENTION

It has long been known that a mass of air is trapped adjacent the juncture of a missile in flight and the engine plume during the powered portion of a missile flight. It is therefore an object of this invention to provide a relatively cheap solid body missile and solid body engine plume simulator to study in wind tunnel tests the characteristics of this trapped air mass.

BRIEF DESCRIPTION OF THE DRAWING

The single view of the drawing represents a section through a portion of a solid body missile configuration together with a solid body engine plume simulator.

DETAILED DESCRIPTION OF THE INVENTION

Referring now to the drawing, 10 indicates the rear portion of a missile model shown in half section and having a longitudinal axis 12. A solid engine plume simulator 14 is fixed to the rear of the missile model 10. The outer configurations 16 of the missile model 10 and 18 of the engine plume simulator 14 causes a zone of trapped air normally defined by line 20. However since in normal flight some of this trapped air aspirates into the engine plume, an annular passageway 22 is formed in the engine plume simulator to allow some of the trapped air to escape thus changing the shape of the zone to that defined by line 24. The zone of trapped air defined by line 24 is more simulative of a missile in actual flight. Therefore, more accurate wind tunnel simulation, resulting in more accurate test data from the air trapped within this zone is obtainable without the use of a more expensive test model and without the use of additional test equipment.

I claim:

1. For use in a wind tunnel test program a solid body missile structure having a missile outer configuration,
   a solid body engine plume simulator fixed to the rear of said solid body missile, said engine plume simulator having an outer configuration similar to a rocket engine plume,
   an annular air passageway in said engine plume simulator surrounding the longitudinal axis of said missile and said plume simulator providing communication between the zone of juncture between said solid body missile structure and said solid body engine plume simulator and the rear of said solid body engine plume simulator.

* * * * *